(12) United States Patent
Widmer et al.

(10) Patent No.: US 9,494,128 B2
(45) Date of Patent: Nov. 15, 2016

(54) DEVICE FOR TAPPING ELECTRICAL ENERGY FROM HYDROPOWER

(71) Applicant: WRH WALTER REIST HOLDING AG, Ermatingen (CH)

(72) Inventors: Felix Widmer, Winterthur (CH); Martin Ruge, Starrkirch-Wil (CH); Markus Felix, Richterswil (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 14/416,490

(22) PCT Filed: Jul. 22, 2013

(86) PCT No.: PCT/CH2013/000134
§ 371 (c)(1),
(2) Date: Jan. 22, 2015

(87) PCT Pub. No.: WO2014/015446
PCT Pub. Date: Jan. 30, 2014

(65) Prior Publication Data
US 2015/0211476 A1    Jul. 30, 2015

(30) Foreign Application Priority Data

Jul. 27, 2012    (CH) .................................... 1181/12

(51) Int. Cl.
*F03B 13/00*    (2006.01)
*F03B 13/10*    (2006.01)
(Continued)

(52) U.S. Cl.
CPC ............... *F03B 13/10* (2013.01); *F01D 15/10* (2013.01); *F03B 7/00* (2013.01); *F03B 7/006* (2013.01);
(Continued)

(58) Field of Classification Search
CPC ........................................................ F03B 13/00
(Continued)

(56) References Cited

U.S. PATENT DOCUMENTS

| 827,845 | A | * | 8/1906 | Bloss | .................... F03B 7/006 |
| | | | | | 198/708 |
| 2,161,215 | A | * | 6/1939 | Wise | .................... F03B 17/066 |
| | | | | | 415/5 |

(Continued)

FOREIGN PATENT DOCUMENTS

| CH | 696770 | 11/2007 |
| EP | 1 731 756 | 2/2006 |

(Continued)

*Primary Examiner* — Joseph Waks
(74) *Attorney, Agent, or Firm* — Rankin, Hill & Clark LLP

(57) ABSTRACT

A plant for extracting electric energy from water power. The plant has an energy extraction module designed as an assembly unit, and includes a drive arrangement, with a multiplicity of flow-impinged components, which can be driven in a circulating direction by water power, two spaced-apart deflection elements around which the drive arrangement is guided in a circulating manner, an electric power generator for extracting electric energy from the circulating drive arrangement, a water conveying duct for forming water receiving compartments interacting with the flow-impinged components, and also a module frame, to which are connected the drive arrangement, the deflection elements, the electric power generator and the water conveying duct. The module frame includes an interface via which the energy extraction module is connected to a sub-structure.

23 Claims, 8 Drawing Sheets

(51) Int. Cl.
*F03B 7/00* (2006.01)
*F01D 15/10* (2006.01)
*F03B 11/02* (2006.01)
*F03B 17/06* (2006.01)

(52) U.S. Cl.
CPC ............. *F03B 11/02* (2013.01); *F03B 17/061* (2013.01); *F05B 2220/707* (2013.01); *F05B 2230/60* (2013.01); *F05B 2240/91* (2013.01); *Y02E 10/223* (2013.01); *Y02E 10/28* (2013.01); *Y02P 70/525* (2015.11); *Y02P 70/527* (2015.11)

(58) Field of Classification Search
USPC .......................................................... 290/54
See application file for complete search history.

(56) References Cited

U.S. PATENT DOCUMENTS

| | | | |
|---|---|---|---|
| 3,927,330 A | 12/1975 | Skorupinski | |
| 4,242,868 A * | 1/1981 | Smith | F03B 17/066 415/5 |
| 4,292,535 A * | 9/1981 | Diggs | F03B 17/066 290/54 |
| 7,063,579 B2 * | 6/2006 | Voves | B63B 35/44 290/54 |
| 7,213,398 B2 * | 5/2007 | Takeuchi | F03B 17/064 60/495 |
| 8,378,517 B2 * | 2/2013 | Lee | F03B 17/068 290/54 |
| 8,534,057 B1 * | 9/2013 | Brown | F03B 17/068 290/54 |
| 8,890,353 B2 * | 11/2014 | Cunnane | F03B 13/10 290/54 |
| 2008/0303284 A1 * | 12/2008 | Clemens | F03B 17/066 290/54 |
| 2010/0181773 A1 * | 7/2010 | Reist | F03B 17/066 290/54 |
| 2010/0283250 A1 * | 11/2010 | Capone | F03B 17/066 290/54 |
| 2012/0313376 A1 * | 12/2012 | Browning, Jr. | F03B 17/068 290/54 |
| 2013/0285384 A1 * | 10/2013 | Schultz | F03B 17/06 290/54 |

FOREIGN PATENT DOCUMENTS

| | | |
|---|---|---|
| EP | 2 461 017 | 6/2012 |
| JP | 2003-042049 | 2/2003 |
| KR | 2011-0007047 | 1/2011 |
| WO | 2011/041918 | 4/2011 |
| WO | 2011/060265 | 5/2011 |

* cited by examiner

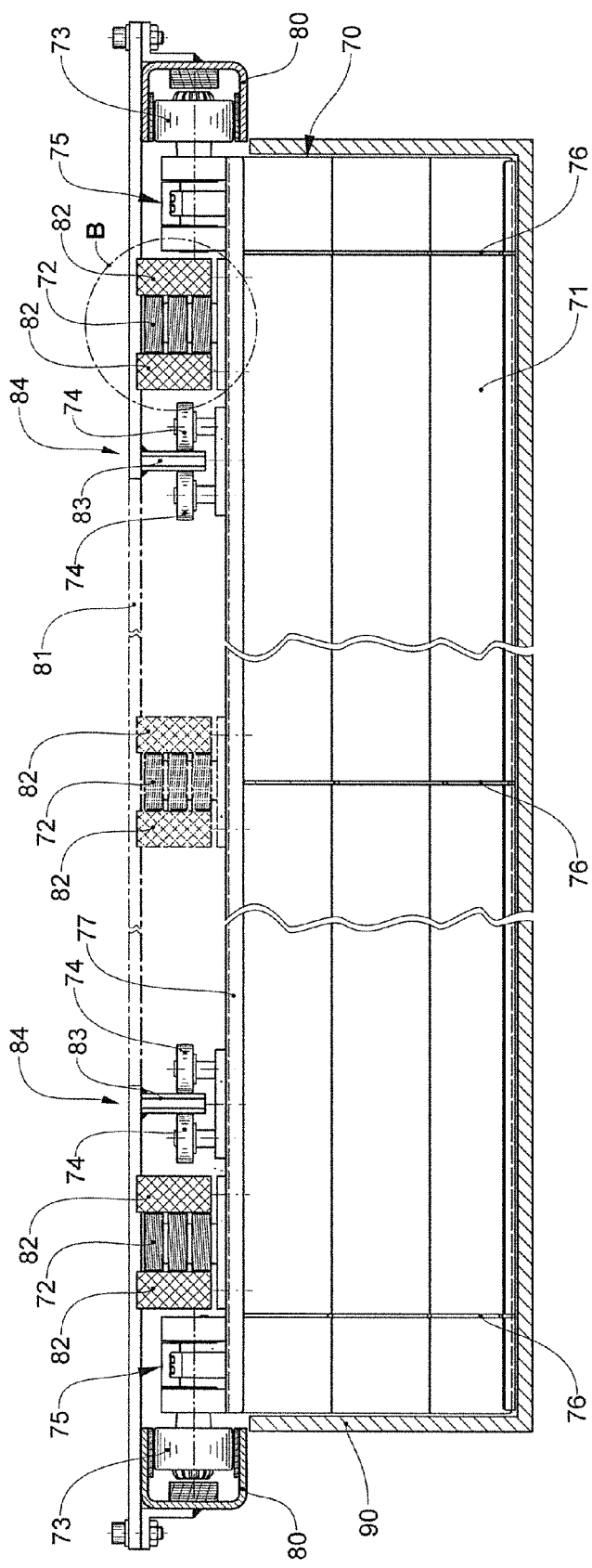
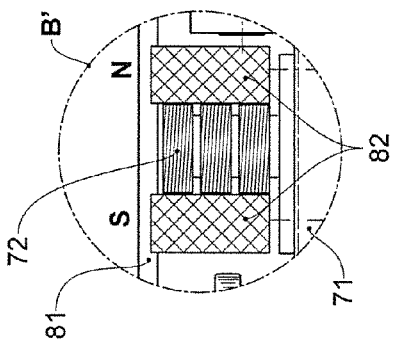
Fig. 7
Fig. 8a
Fig. 8b

DEVICE FOR TAPPING ELECTRICAL ENERGY FROM HYDROPOWER

BACKGROUND OF THE INVENTION

1. Field of the Invention

The invention relates to a plant for extracting electric energy from water power.

2. Description of Related Art

Knowledge exists of many devices that utilize the potential drop of water or its kinetic energy in order to convert electric energy therefrom. In this context, a differentiation is basically made between two plant types.

According to a first plant type, the kinetic energy of the onflowing water is utilized in order to thereby drive a generator for power generation. To this end, provision is made for flow-impinged components, such as turbine blades, which are impinged upon by a flow of water and set in motion thereby. Water power plants of the first type are found in run-of-the-river power stations or storage power stations. The undershot water wheel is also operated in this way.

According to a second plant type, the kinetic energy of the onflowing water is not primarily used, but rather its released potential energy during the execution of a potential drop. That is to say, according to this principle the gravitational force of the water, which acts upon a flow-impinged component, drives a drive element. This principle is used in the case of the overshot water wheel, for example.

In the present invention, the term "extraction of electric energy" is used. This term is synonymous to the frequently used terms such as "energy conversion", "power generation" or "energy production".

EP-A-1 731 756 describes a water power plant, for example, in which the potential energy of water is used for the conversion of electric energy. The plant includes a water power unit with a vertical chute and an electric power generator, which is connected to the water power unit. Blades, which are fastened to a chain and receive a specific volume of water, are arranged in the chute. As a result of the weight of the water which bears upon the blades, the chain, and via this, an electric power generator, are driven. The plant is comparatively inflexible with regard to its application capabilities since this can only be designed together with a vertical chute.

WO 2011/041918 also describes a plant for the conversion of electric energy from water power, and comprises a circulating drive chain with a load run and a return run. The drive chain is guided in a circulating direction around two deflection elements that are arranged in an offset manner to each other, both horizontally and vertically. The drive chain comprises a multiplicity of flow-impinged components, which are arranged one behind the other in the circulating direction and spaced apart. The flow-impinged components in each case form part of a chain link of the drive chain. On the side of the load run, the flow-impinged components engage in an inclined water conveying duct and, with the duct sidewalls and the duct bottom, form water receiving compartments. In an inlet region, the individual water receiving compartments receive a specific volume of water, which is only released again from the water receiving compartment in the outlet region.

Furthermore, the plant comprises a generator for the conversion of electric energy from the circulating drive chain. The water, at a higher-located inlet region, is fed into the water conveying duct, wherein the blades, which are immersed in the water conveying duct, retain the inflowing water in the formed water receiving compartments. The blades are driven by the weight force of the water, as a result of which the water in the receiving compartments is guided along the water conveying duct to a lower-located outlet opening. The described solution has the disadvantage that the blade guiding in the water conveying duct is rather inaccurate so that the receiving compartments are too permeable in the movement direction for the water being carried along and some of the water being carried along flows down the water conveying duct to the outlet region without being utilized. In addition, the installation of the plant is also comparatively complex and intricate. Furthermore, the energy conversion is not implemented in an optimum manner.

SUMMARY OF THE INVENTION

It is therefore an object of the present invention to optimize the guiding of the flow-impinged components in the water conveying duct and also to improve the water guiding in general and also to optimize the energy conversion so as to increase the efficiency of the plant at the very least. In addition, the plant is to be able to be installed in a quick and simple manner at site.

In accordance with the present invention, a plant incudes an energy extraction module that is designed as an assembly unit. The energy extraction module includes a drive arrangement with a multiplicity of flow-impinged components that can be driven in a circulating direction by water power. In addition, the energy extraction module includes at least two spaced-apart deflection elements, around which the drive arrangement is guided in a circulating manner.

The flow-impinged component includes a wall-like flow-impinged component that extends transversely across the water conveying duct.

Furthermore, the energy extraction module includes at least one generator for extracting electric energy via the circulating drive arrangement. Moreover, the energy extraction module also includes a water conveying duct for forming water receiving compartments interacting with the flow-impinged components.

In addition, the energy extraction module also includes a module frame to which are connected the drive arrangement with the flow-impinged components, the deflection elements, the electric power generator and the water conveying duct. The module frame can be designed as a cage-like structure. The module frame is especially a structure having, or consisting of, profiles and connecting elements.

The module frame includes an interface means via which the energy extraction module can be connected to a sub-structure resp. a sub-contruction in a detachable or non-detachable manner. The interface means are preferably arranged on the frame base. The module frame is connected, via the interface means, to the sub-structure by a form-fitting, materially bonding and/or mechanical connection. The connection can be a bolted connection, riveted connection, welded connection or adhesive bond or a combination of a plurality of connection types.

The interface means of the module frame, according to one preferred embodiment, includes modular feet via which the energy extraction module can be connected to the sub-structure. To this end, the module frame, and with this the energy extraction module, are supported on the sub-structure via the modular feet.

The sub-structure can be a foundation arranged directly in the ground or a support structure arranged between the foundation or the ground and the energy extraction module.

In accordance with the present invention, the plant includes a support structure, designed as a sub-structure, in the form of a sub-frame on which the energy extraction module is supported via its interface means. That is to say, the energy extraction module is fastened on the sub-frame via its interface means.

The sub-frame is preferably also supported on a foundation via corresponding interface means. That is to say, the sub-frame is fixed on the foundation via its interface means in a detachable or non-detachable manner. The sub-frame is preferably connected to the foundation via the interface means by bolted connections or riveted connections.

The interface means of the sub-frame can include frame feet, which are supported on the foundation and connected to this.

According to a preferred embodiment, the sub-frame is designed as a ladder frame with longitudinal side rails and rungs extending transversely to the side rails. The longitudinal side rails preferably extend parallel to the circulating direction of the energy extraction module or parallel to the duct of the process water.

Moreover, the sub-frame also includes connection interfaces for connecting this to the connection interfaces of the module frame, especially for receiving the modular feet of the module frame.

The sub-frame is preferably individually designed based upon the topography of the sub-surface or upon the position of the foundations. The sub-frame, however, has fastening interfaces in each case which are designed to match the connection interfaces, especially the modular feet, of the module frame. As a result, the module frames can always be designed the same regardless of the topography of the installation site or the arrangement of the foundations. The sub-frame performs, in this sense, the function of an adapter between sub-surface or foundation and module frame.

The sub-frame can be designed in a step-like manner, for example for the purpose of adapting to the foundations that are horizontally orientated in a slope of the ground.

According to one development of the invention, the module frame includes fastening elements via which the energy extraction module can be connected to an installation device for the purpose of installation upon the sub-structure. The installation device can be a lifting device, for example, to which the energy extraction module can be fastened via the fastening elements.

Using the lifting device, the energy extraction module is guided over the installation site and set down at the correct position.

Moreover, the present invention also relates to an energy extraction module for a plant according to the invention. The energy extraction module is distinguished by the fact that this is designed as an assembly unit. The energy extraction module, according to the invention, includes the features referred to hereinbefore.

The energy extraction module can furthermore include guiding means, along which the flow-impinged components are positively guided at least in the region of the water conveying duct, i.e. in the region of the load section. To this end, the flow-impinged components preferably have guide elements that operate in conjunction with the guiding means. The guiding means can be part of the module frame.

The guiding means are preferably guide profiles which extend parallel to the circulating direction. The energy extraction module especially preferably has two guide profiles that are arranged parallel to each other at the sides on the outside. The guide profiles preferably form running surfaces or slide surfaces for the guide element.

The guide profiles preferably form a part of the module frame. The two guide profiles, which are arranged parallel and next to each other, can be connected via transverse struts, forming a cage-like structure.

The guide elements can be formed as guide rollers or slide elements. The slide elements can be slide blocks. The term "rollers" embraces all bodies that are suitable for rolling over a surface. Wheels and balls, for example, are also covered by this.

"Positively guided" means that the guide elements are guided via the guiding means—with regard to a three-dimensional orthogonal or polar coordinate system—at least in two spatial directions. These two spatial directions are preferably opposite each other.

The energy extraction module includes an upper deflection element and a lower deflection element. The upper deflection element is arranged in an inlet region in which the water is admitted into the water conveying duct. The lower deflection element is arranged in an outlet region in which the water is released from the water receiving compartments.

The two deflection elements, in the installed position, are preferably arranged, both horizontally and vertically, in an offset manner to each other. The water conveying duct is formed with an inclination in the installed position.

Between the upper deflection element and the lower deflection element, the drive arrangement, in the region of the water conveying duct, forms a load section in which the flow-impinged components are moved from the upper deflection element to the lower deflection element. Above the load section, the drive arrangement forms a return section in which the flow-impinged components are returned from the lower deflection element to the upper deflection element.

The flow-impinged components, in the region of the load section, are orientated transversely to the water conveying duct and engage in this.

The load section preferably extends parallel to the flow direction of the water along the load section. The flow-impinged components move along the load section preferably in the flow direction of the water. The water conveying duct preferably extends parallel to the flow direction of the water.

Two adjacent flow-impinged components form, in each case, in the region of the load section a water receiving compartment that is moved along the water conveying duct. The movable water receiving compartment is delimited at the sides by stationary duct walls, as seen in the movement direction. The flow-impinged component, which is impinged upon by water in an inlet region, therefore serves as a partition that delimits the water receiving compartments in the longitudinal direction of the water conveying duct.

In the inlet region, the individual water receiving compartments receive a specific volume of water that is only released again from the water receiving compartment in the outlet region.

The plant preferably comprises a water feed duct that directs the process water from the inlet region to the water conveying duct of the energy extraction module.

According to a further development of the invention, the plant includes a coupling unit via which the water conveying duct of the energy extraction module can be coupled to the water feed duct. The coupling unit is correspondingly arranged towards the inlet region. The coupling unit can include a slide device by means of which the feed of water from the water feed duct into the water conveying duct can be regulated.

The coupling unit preferably also has connection interfaces via which this can be connected to the sub-structure, e.g. to a sub-frame or to a foundation. The coupling unit can be designed as part of the energy extraction module or as a separate sub-assembly.

The water conveying duct preferably forms a U-shaped cross-sectional profile with a duct bottom and two duct side walls. The flow-impinged components are expediently guided in a contact-free manner in relation to the water conveying duct.

Since the position of the flow-impinged components relative to the water conveying duct can be fixed very accurately due to the positive guiding through the guiding means, the flow-impinged components have very small distances to the adjacent duct walls. The gap distance for example may be only 1 to 5 mm, especially only 2 to 3 mm.

An essential advantage of the plant according to the invention lies in the fact that the energy extraction module can already be prefabricated at the manufacturers with correspondingly small manufacturing tolerances, especially when it comes to the interaction of flow-impinged component and water conveying duct, and can be delivered as a complete sub-assembly and installed at site. Accordingly, during installation at site adjustments to the energy extraction module no longer need to be undertaken. The adjustment and alignment of components, as inevitably occur during an assembly at site, are no longer necessary.

The flow-impinged components are preferably designed as wall elements, especially as blade-like wall elements. The flow-impinged components, on both sides, for example, can have side wall sections that are curved opposite to the movement direction of the drive arrangement and that form a blade-like receptacle. Due to such a shape, the intake process of the water is optimized.

So that the wall-like flow-impinged components have a sufficiently high degree of rigidity in order to withstand the water pressure, these preferably have in each case at least one stiffening element, also referred to as reinforcing element. The flow-impinged components preferably have in each case at least two stiffening elements that are arranged off-centre or to the side. The stiffening elements are preferably arranged in a lateral end region of the flow-impinged components. The stiffening elements can be formed as stiffening ribs or stiffening walls or transverse walls, for example.

The design of the drive arrangement can be different with regard to the functional interaction between the individual flow-impinged components.

In accordance with on aspect of the invention, the flow-impinged components are not interconnected, i.e. are formed independently of each other with regard to connection technology. The drive arrangement, according to this aspect, is driven by transmission of pressure forces between the flow-impinged components. The flow-impinged components are designed as pressure bodies and include force transmission elements for transmitting pressure forces from a trailing flow-impinged component in the circulating direction to a preferably directly preceding flow-impinged component.

The force transmission elements can form pressure surfaces, for example, via which the pressure forces can be transmitted between the flow-impinged components. In this way, the drive arrangement, similar to a drive chain, can be moved in the circulating direction around the deflection elements but without the flow-impinged components being interconnected.

According to another aspect of the invention, the drive arrangement is designed as a continuous drive structure, similar to a drive chain, with a multiplicity of connected drive links, similar to chain links, wherein the drive links preferably correspond to the flow-impinged components. The flow-impinged components comprise connecting elements for the articulated connection of adjacent flow-impinged components, forming a drive structure.

The drive links of the drive structure can be driven in the circulating direction along its circulating path by transmission of tensile forces, pressure forces or a combination of tensile and pressure forces. A combination of tensile and pressure forces is to be understood as that of the drive links being driven via tensile forces in some sections of the circulating path and via pressure forces in other sections of the circulating path.

Each drive link, as seen in the circulating direction, can comprise guide elements that are attached to these on both sides for the positive guiding of the drive structure along the water conveying duct, at least in the region of the load section.

Furthermore, each drive link, as seen in the circulating direction, can include connecting elements that are attached to the drive link on both sides for the articulated connection of adjacent drive links, forming a drive structure. The drive links are pivotably interconnected especially in a plane parallel to the movement direction or circulating path of the drive structure. In an especially preferred embodiment of the invention, the guide elements are arranged on the connecting element and connected to the connecting element via a connecting pivot. The connecting pivot is preferably designed at the same time as a connecting element between the drive links. The connecting pivots in this case undertake the function of a connecting pin. Naturally, the connection between the drive links can also be designed independently of the connection of the guide elements.

The guide elements, as seen in the circulating direction, are preferably arranged in each case outside the lateral end of the flow-impinged component.

The guide profile can be designed as a guide rail, for example, for accommodating the guide elements in a guiding manner. The guide rail especially include a guide channel. The guide rail or the guide channel has a running surface for the guide elements, for example a slide surface for the slide elements or a roll surface for the guide rollers, which are also referred to as running rollers.

The guide channel is preferably designed so that this forms a slide surface or roll surface on two oppositely disposed sides.

The guide channel is preferably of a U-shaped or C-shaped design and, for example, has two profile legs and a connecting wall. The guide channel is open towards the guide elements. According to a particular embodiment, the guide channel is open towards the water conveying duct.

One of the profile legs forms the running surface of the guide elements, for example. The connecting wall between the two profile legs forms, for example, the guide surface for a lateral guide element on the flow-impinged component. Since the flow-impinged component preferably has at least one guide element on both sides, provision is correspondingly made in each case for a guide profile on both sides of the flow-impinged components. These preferably extend parallel to each other.

If use is made of U-shaped or C-shaped guide profiles that are open towards the water conveying duct, then these have two oppositely disposed guide surfaces for the guide elements. As a result, the flow-impinged components cannot be pushed away upwards or lifted by the water pressure in the region of the load section.

In further accordance with another aspect of the invention, the deflection elements are formed by arcuate sections of the guide profile that interconnect the guide profiles in the load section and return section. In this way, the flow-impinged components are also positively guided in the deflection region by the guide profiles. The arcuate sections of the guide profiles can also be part of the deflection element that can also include a rotatable body, for example, as described further below.

In further accordance with the present invention, one of the deflection elements, especially the upper deflection element that is located in the inlet region, includes a rotatable body, especially a drive wheel, which is driven by the movement of the drive arrangement, which is guided partially circumferentially around the rotatable body. The drive arrangement is, for example, in a partially circumferential form-fitting and/or frictionally locking engagement with the rotatable body so that this is driven by the drive arrangement, for example at the speed of the drive arrangement.

If the deflection element is formed by the guide profile itself, then the aforesaid and subsequently described rotatable body is associated with the deflection element. Rotatable body and guide rail can also commonly form by definition the deflection element since both devices are involved in the deflection of the drive arrangement.

The rotatable body has drive recesses that are arranged along its circumference, for example, in which elements of the flow-impinged components engage and in this way drive the rotatable body. These elements can be connecting elements of drive links or roller pivots of guide rollers.

The deflection element is coupled to the electric power generator, for example. The electric power generator can be directly coupled to the rotational axis of the rotatable body. In addition, the rotational movement can also be transmitted via a gear unit from the rotatable body to the electric power generator. The electric power generator, which is coupled to the upper deflection element, is in this case driven by the compressive force and/or tensile force of the flow-impinged components.

The electric power generator can also be part of a tractive drive in which the drive arrangement or the movable flow-impinged components in the load section drive a circulating flexible power transmission element which in turn drives the electric power generator.

In further accordance with an aspect of the invention, that deflection element that has no association with the electric power generator, or both deflection elements, has, or have, guide rails extending in a curved manner and disposed on both sides of the flow-impinged bodies, in which guide rails the flow-impinged components are positively guided via their guide elements and deflected from the load section into the return section, or vice versa.

In further accordance with an aspect of the invention, the flow-impinged components are positively guided via their guide elements in guide rails along the entire circulating path. That is to say, the plant has a closed positive guiding of the flow-impinged components along the circulating path of the drive arrangement. The closed positive guiding is used especially with drive arrangements in which the flow-impinged components are not interconnected, i.e. are not interlinked.

A further independent invention also relates to a plant for extracting electric energy from water power. The plant includes:

a drive arrangement, with a multiplicity of drive elements, which can be driven in a circulating direction by means of water power;

at least two spaced-apart deflection components, by means of which the drive arrangement is guided in a circulating manner;

at least one electric power generator, which is driven by means of the circulating drive arrangement, for extracting electric energy; and also a water conveying duct, especially for forming water receiving compartments interacting with the flow-impinged components.

The drive arrangement, the deflection elements, the electric power generator and, if applicable, also the water conveying duct can be arranged in a frame.

The drive arrangement forms a load section in the region of the water conveying duct. The load section is distinguished by that section of the drive arrangement in which the water by its weight force acts upon the flow-impinged components of the drive arrangement and sets these in motion as a result.

That is to say, in the load section the flow-impinged components are directed from a higher gravitational potential, at which the water flows into the water conveying duct, to a lower gravitational potential, at which the water leaves the water conveying duct.

In the region of the load section, the flow-impinged components are orientated transversely to the water conveying duct and engage in the water conveying dut. To this end, the flow-impinged components include, in each case, a wall-like flow-impinged element that extends transversely in the water conveying duct.

In the region of the load section, two adjacent flow-impinged components form, in each case, a water receiving compartment that is moved along the water conveying duct. The movable water receiving compartment, as seen in the movement direction, is delimited at the sides by stationary duct walls. The flow-impinged component that is impinged upon by flow of water in an inlet region that is arranged at the higher gravitational potential therefore serves as a partition, which delimits the water receiving compartments in the longitudinal direction of the water conveying duct.

In the inlet region, the individual water receiving compartments receive a specific volume of water that is only released again from the water receiving compartment in the outlet region, which is arranged at the lower gravitational potential.

The flow-impinged components are positively guided in the water conveying duct via corresponding guiding means. The guiding means can correspond to the guiding means that are described herein.

The flow-impinged components, as described above, can be designed as pressure bodies or can be interconnected via connecting means, forming a chain-like drive arrangement.

The drive arrangement forms a return section that lies opposite the load section and in which the flow-impinged components are moved back again from the lower gravitational potential to the higher gravitational potential.

The load section is preferably arranged beneath the return section. The load section, however, can also be arranged above or to the side of the return section.

The plant according to these further aspects of the invention can especially correspond to a plant with a module frame, which is described herein.

According to the present invention, the electric power generator is a linear generator. The linear generator is distinguished by the fact that this converts a kinetic energy, developing in a mechanical longitudinal movement, into electrical energy. To this end, the linear generator forms a subsequently described energy extraction path that lies at least partially in the load section.

A linear generator includes a field magnet, which forms a magnetic field, and also a field coil that interacts with the magnetic field. As a result of the movement of the field coil relative to the magnetic field of the field magnets, a magnetic flux change is created. The voltage induced as a result of the magnetic flux change in the field coil is tapped via corresponding means.

According to the present invention, the flow-impinged components or the drive arrangement are, or is, driven by the potential drop, i.e. by the weight force of the water that is carried along in the water carrying compartments. The moving flow-impinged components, or the moving drive arrangement, bring about a relative movement between a field coil and a field magnet of the linear motor, which in turn induces an electrical voltage. The electrical voltage is tapped via corresponding means.

The kinetic energy, from which electric energy is converted in the linear generator, is produced by a body that is moved along a non-continuous path, the body being a flow-impinged component in the present case.

The path section along which electric energy is converted by a corresponding arrangement of field coils and field magnets is subsequently referred to as an energy extraction path.

In contrast to a rotary generator, the kinetic energy therefore does not develop as a result of a body that rotates around a rotational axis. The non-continuous energy extraction path of a linear generator is therefore developed in the broadest sense in comparison to a conventional generator. The energy extraction path, along which kinetic energy is converted into electric energy, is preferably rectilinear, or essentially rectilinear. It can also follow the path of a curve, however.

The linear generator corresponds in some way to the functional opposite of the linear motor which conversely converts electric energy into translational kinetic energy.

In the linear generator, the field magnet and the field coil are displaced relative to each other in a mechanical longitudinal movement, especially in a linear movement, which leads to a timewise changing magnetic flux and correspondingly to a voltage induction. The field coil is arranged along a non-continuous energy extraction path of the type described above. In the linear generator, either the field magnet or the field coil is arranged in a stationary manner, whereas the other component, or other components, moves, or move, longitudinally especially in a linear manner.

The energy extraction path extends at least partially, but preferably completely, in the load section. The energy extraction path, however, can also extend into the region of the deflection elements or into the return section. In addition, a plurality of energy extraction paths with a plurality of linear generators can be provided along the circulating path of the drive arrangement.

According to a preferred embodiment, the field magnets are moved. To this end, the movable field magnets interact with the flow-impinged components. "Interacting" means that the field magnets are driven at least in sections by the flow-impinged components. This can occur by the field magnets being fastened on the flow-impinged components.

The field magnets, however, can also be carried via a separate circulating device independently of the flow-impinged components. In one region of the load section, the field magnets interact with the flow-impinged components and are driven by these. To this end, the field magnets engage in, or are in mechanical communication with, the flow-impinged components in the region. This engagement can be formed by a toothing arrangement or by frictional engagement, for example.

The field magnet arrangements are preferably attached in each case on the movable flow-impinged components, whereas the field coils or the field windings are part of stationary generator devices. This simplifies the tapping of the generated electric voltage. The field magnet arrangement corresponds in this sense to the rotating component or the rotor. The field coil arrangement corresponds in this sense to the stationary component or stator.

The field magnets are formed as magnetic induction sources, e.g. permanent magnets or electromagnets.

The generator devices, which comprise the stationary parts of the electric power generator, are preferably arranged in a region of a linear extending load section. The generator devices are preferably arranged above the opening of the water conveying duct in the region of the positive guiding of the flow-impinged components. The generator devices are especially arranged opposite the flow-impinged components.

The generator devices are preferably attached on a frame of the plant, especially on a module frame. The generator devices are preferably arranged inside the frame between the load section and the return section and also between the at least one upper deflection element and the at least one lower deflection element. The generator devices preferably include mounting components that are arranged above the duct opening and on which are arranged the field coils.

Since the flow-impinged components are positively guided via guide profiles, the linear generator can be designed for small tolerances. In this way, an air gap of just ½ to 1/20 mm can be provided between the magnets and the field coil. This has an advantageous effect upon the efficiency of the energy extraction.

The use of a linear generator has the great advantage that the force that acts upon the flow-impinged components as a result of the water load is extracted where it is created, that is to say in the load section. In this way, the weight force of the water bears upon the wall-like flow-impinged elements of the flow-impinged components, which extend transversely across the water conveying duct. The flow-impinged components are driven by the loading weight force of the water. The movement of the flow-impinged components, however, brings about at the same time a relative movement between a field coil and a magnetic field of a field magnet. The consequently generated voltage induction in turn leads to a force that counteracts the weight force of the water.

Since the field coil or the field magnet of the linear motor is attached in each case on the flow-impinged component and the load reduction for generating electric energy is especially carried out in the region of the flow-impinged component lying opposite the duct bottom, both forces act directly upon the flow-impinged component, specifically at the place of their origin, that is to say in the load section.

This leads to a significantly lower mechanical loading of the connecting elements of the flow-impinged components if these elements are connected, forming a chain, or of the pressure surfaces if these elements are designed as pressure bodies.

The drive arrangement is therefore mechanically stressed to an altogether considerably lesser degree. In particular, considerably fewer compressive stresses or tensile stresses occur since the forces which these stresses create are already reduced at the place of origin in the load section by means of the linear generator. As a result, the service life of the drive arrangement is significantly increased and the maintenance cost is reduced.

Furthermore, there is no limitation with regard to the length of the load section due to the arrangement according to the invention of a linear generator in the load section. The length of the drive arrangement, particularly in the case of conventional plants, is limited by the loading of the drive arrangement—as a result of tensile and compressive forces—which increase with its length. This limitation ceases to apply for the reasons referred to above.

In addition, the load section, due to the arrangement according to the invention of a linear generator in the load section, can also comprise a plurality of sections with different inclinations or curvatures. As a result, the terrain can be followed with the load section.

According to one further development of the invention, a plurality of linear generators, which are arranged in series one behind the other, can be provided along the load section. In addition, a plurality of linear generators, which are arranged parallel next to each other, can also be provided along the load section. A combination of series and parallel arrangements is also conceivable.

Provision can especially be made for a plurality of field coils that are arranged in series one behind the other and/or parallel next to each other and operate in conjunction with corresponding field magnets on the flow-impinged components.

The plant according to the invention described above, with at least one linear generator, is to be understood as an independent invention that is not necessarily tied to a modular construction of the plant. The corresponding features with regard to the linear generator are therefore to be considered as being independent.

The load section and, if applicable, also the return section, preferably extend in an oblique plane. That is to say, the flow-impinged components are moved along in a linear manner in these regions and with a constant inclination angle to a horizontal plane. It is also conceivable, however, that the inclination angle is variable in the region of the load section and/or return section. The water conveying duct, and also the load section accordingly, can also be divided into a plurality of for example linear duct sections or load subsections which have in each case different inclination angles compared with the adjacent sections.

The water conveying duct extends between the upper deflection element and lower deflection element, preferably parallel to the guide profile, or guide profiles. The water conveying duct therefore preferably also lies in an oblique plane. The inclination angle α of the oblique plane is larger than 0°. Furthermore, the inclination angle α is smaller than, or equal to, 90° (angular degrees). The inclination angle is preferably larger than 10° and especially larger than 20°. Furthermore, the inclination angle is preferably smaller than 80° and especially smaller than 70°. The inclination angle especially preferably lies within a range of between 30° and 60°.

For operating the plant according to the present invention, water is admitted into the inclined water conveying duct of the plant in a higher-located inlet region. Flow-impinged components are guided by the upper deflection element in an arcuate, especially circular, movement path from the return section into the inlet region and are immersed in the water conveying duct.

During the immersion process, water flows from the feed duct into the water conveying duct and flows onto the flow-impinged component being immersed. The onflowing water is therefore directed into the simultaneously forming water receiving compartments. During this, the water is retained in the water receiving compartments. That is to say, the water cannot flow freely down the water conveying duct.

The water that is contained in the receiving compartments drives the flow-impinged components by means of its potential drop—that is to say induced by gravitational force—along the water conveying duct in the direction of the lower deflection element or outlet region. At the lower deflection element, the flow-impinged components, via an arcuate or even partially circular movement path, are swung out of the load section again and out of the water conveying duct accordingly so that the water being carried along is released from the water receiving compartments in the outlet region and can be carried away.

Naturally, additional deflection elements can occasionally be provided between the upper deflection element and lower deflection element.

The functioning principle of this plant differs from other plants by the fact that the flow-impinged components, and correspondingly the drive arrangement, are driven by the weight force of the water in the water receiving compartments, that is to say by its gravitational pressure.

The water power plant according to the invention is used especially where water has to flow through a difference in levels. This water can be flowing water or outlet water of weirs, for example. Since the official requirements for components in flowing waters can be very strict, the use of the plant according to the invention is suitable especially in the case of already existing hydrotechnical constructions or other industrial plants.

Therefore, the plant is used, for example, in sewage treatment plants, e.g. before the purified water is released into a body of water, or in industrial plants in which larger quantities of industrial water are converted for processes. The plant according to the invention is already suitable for drop heights of 2 to 20 m. However, greater drop heights can certainly also be utilized.

The positive guiding of the flow-impinged components in the load section allows an exact alignment of these in the water conveying duct. Therefore, the flow-impinged components, which are preferably guided in a contact-free manner with regard to the water conveying duct, can be designed with comparatively small tolerances in relation to the water conveying duct.

BRIEF DESCRIPTION OF THE DRAWINGS

The invention is explained in more detail below with reference to figures. The figures show particular embodiments and further developments of the invention, which are not in any way to be considered as being final. In the drawing:

FIG. 7: shows a cross section through a flow-impinged component which is guided in a guide channel;

FIG. 8a: shows an enlarged detail of the region of the field coil/magnet arrangement according to FIG. 7;

FIG. 8b: shows an enlarged detail of the region of the field coil/magnet arrangement according to FIG. 7;

DETAILED DESCRIPTION OF THE INVENTION

Figure 1:
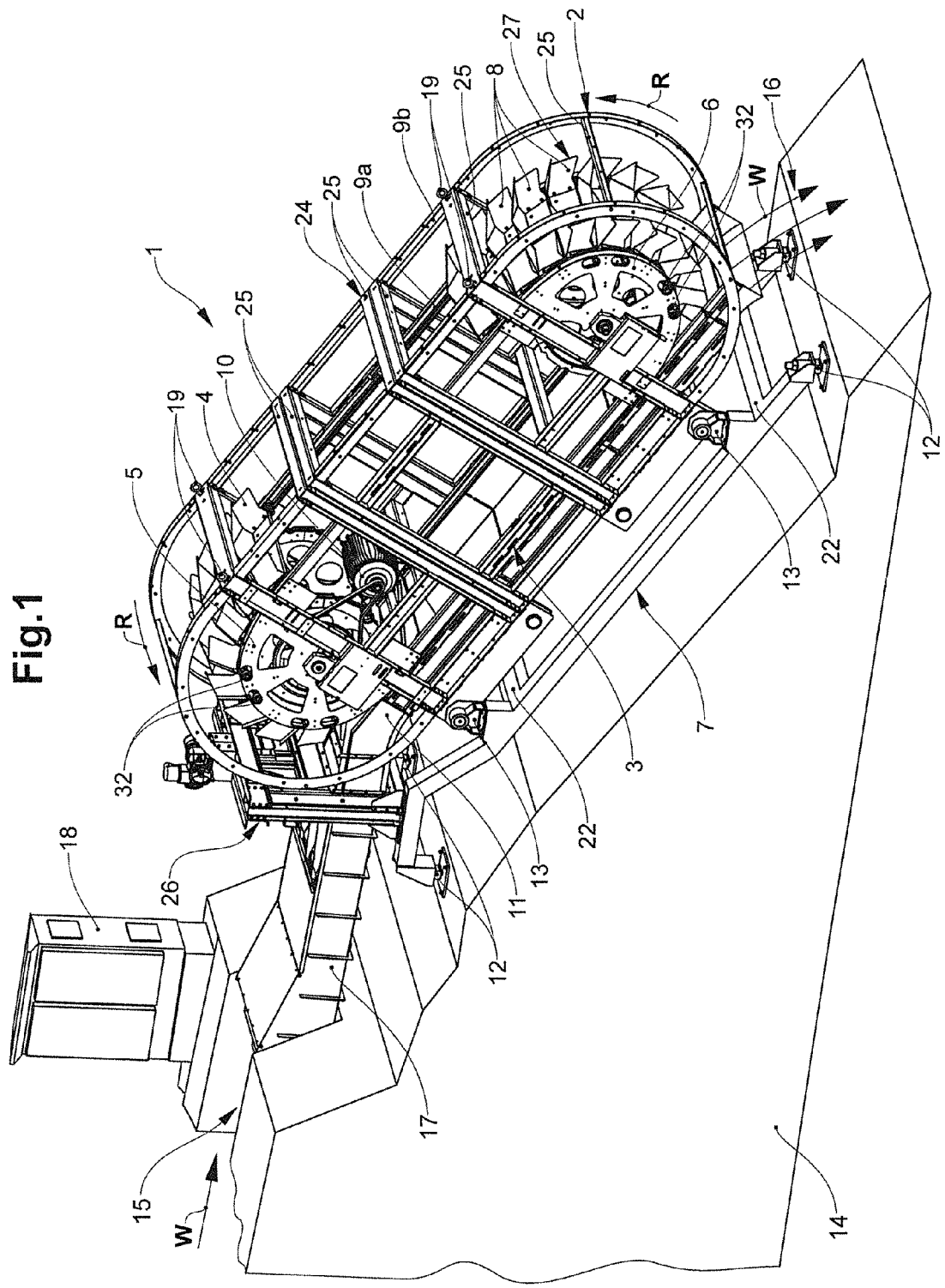
FIG. 1: shows a perspective view of a plant according to the invention.

The plant 1 according to the invention, shown in FIG. 1, for extracting electric energy from water power is installed in a water conveying region with a drop. The plant 1 includes an energy extraction module 2. Process water, in a flow direction W, is fed to the water conveying duct 11 of the energy extraction module 2 from a water inlet region 15 via a water feed duct 17. The process water is guided along the drop through the water conveying duct 11 and in an outlet region 16 is released again from the energy extraction module 2.

The energy extraction module 2 includes a drive arrangement with a multiplicity of flow-impinged components 8. The flow-impinged components 8 of the drive arrangement are guided or driven in a circulating manner around an upper first deflection element 5 and around a lower second deflection element 6, which is at a distance from the first deflection element 5, in a circulating direction R.

The flow-impinged components 8 are interconnected, forming a drive chain. The flow-impinged components 8 are positively guided via guide profiles 9a, 9b, which are arranged in pairs and parallel to each other at the sides of the flow-impinged components 8. The guide profiles 9a, 9b form a circumferentially closed guide for the flow-impinged components 8. The flow-impinged components 8 have guide rollers 32, attached at the sides, which are guided in the guide profiles 9a, 9b.

The guide rail pair 9a, 9b has guide rail sections, which are formed straight, between the two deflection elements 5, 6, and extend parallel to each other. The straight guide rail sections are inclined in the installed state of the plant 1. The inclination corresponds to the drop. The guide rails 9a, 9b are guided around the deflection elements 5, 6 in an arc in the region of the deflection.

The guide profile pair 9a, 9b forms a continuous lateral guide for the flow-impinged components 8. The guide profiles 9a, 9b are designed as U-sections that are open in each case towards the flow-impinged component 8. In the region of the load section 3, the guide profiles 9a, 9b are arranged to the side and above the water conveying duct 11.

The energy extraction module 2 also includes a water conveying duct 11 that extends in the lower region from the upper deflection element 5 to the lower deflection element 6. The water conveying duct 11 forms a U-shaped channel and in the installed state of the plant 1 has an inclination that corresponds to the drop.

The drive arrangement, in the region of the water conveying duct 11, forms a load section 3 and also a return section 4 that extends over the load section 3 and parallel to the load section 3.

The positively guided flow-impinged components 8 extend in the water conveying duct 11 in the load section 3. The flow-impinged components 8, which are arranged transversely to the water conveying duct 11, together with the water conveying duct 11, form water receiving compartments.

The upper deflection element 5 and lower deflection element 6 include, in each case, a rotatable body that is rotatably mounted around a rotational axis. The rotatable body is driven by movement of the drive arrangement that is partially circumferentially guided around the rotatable body. The drive arrangement is in a partially circumferentially form-fitting and/or frictionally locking engagement with the rotatable body.

The energy extraction module 2 furthermore includes an electric power generator 10 that is coupled via a gear unit to the upper deflection element 5 or to the rotatable body. The electric power generator 10 converts potential energy of the water, which is guided in the water receiving compartments along a potential drop downwards to the outlet region indirectly via the drive arrangement, which is driven along a circulating path, into electric energy.

The drive arrangement with the flow-impinged components 8, the deflection elements 5, 6, the electric power generator 10 and the water conveying duct 11 are accommodated in a module frame 24 and connected to the module frame 24. The guide profiles 9a, 9b form a part of the module frame 24. The two guide profiles 9a, 9b, which are arranged parallel to and next to each other, are connected via transverse struts 25, forming a cage-like structure, for this purpose.

The module frame 24 comprises interface means in the form of four modular feeds 13 which are arranged in each case on the side of the frame base.

The plant 1 additionally comprises a sub-frame 7. The sub-frame 7 is in the form of a ladder frame and comprises two parallel extending longitudinal side rails 21a, 21b and also rungs 22 which interconnect the longitudinal side rails 21a, 21b. The longitudinal side rails 21a, 21b are orientated parallel to the plane which is formed by the circulating direction R of the energy extraction module 2.

The sub-frame 7 comprises four frame feet 12 on its frame base, via which the sub-frame 7 is supported on the foundation.

Figure 2:
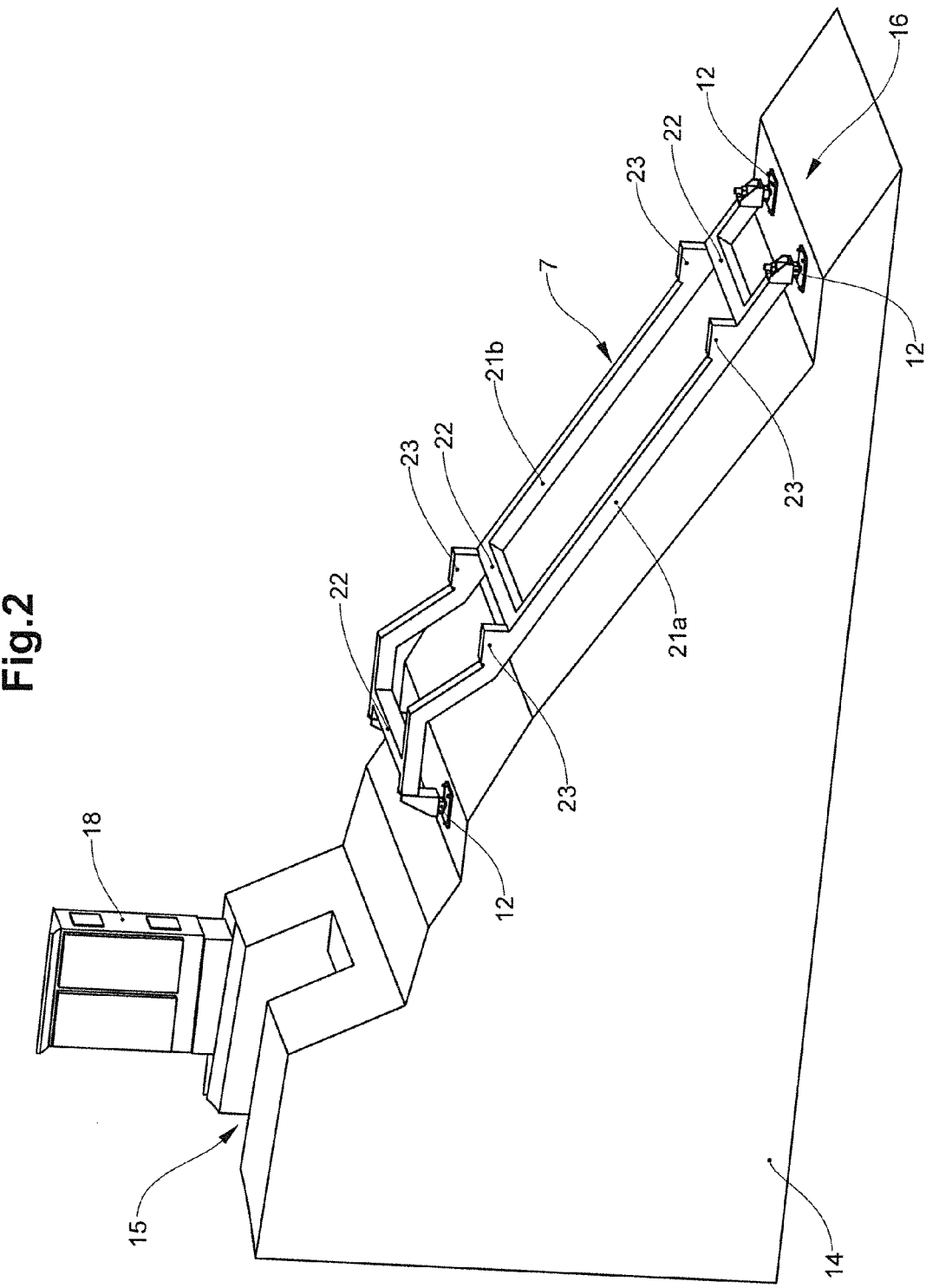
FIG. 2: shows a perspective view of a plant according to the invention without energy extraction module.

The sub-frame 7 additionally has interface means 23 on its upper side for accommodating the modular feet 13. The module frame 24 is bolted to the sub-frame 7 via the modular feet 13 (see also FIG. 2).

The sub-frame 7 is individually designed based upon the topography of the ground 14 or upon the position of the foundations. The sub-frame 7 is bolted in the foundation via the frame feet 12.

The energy extraction module 2 furthermore includes a coupling unit 26, arranged towards the inlet region 15, via which the water conveying duct 11 is coupled to a water feed duct 17. The water feed duct 17 guides the process water from the inlet region 15 to the water conveying duct 11.

The coupling unit 26 is also bolted to the sub-frame 7 via corresponding threaded connections.

The module frame 24, in its upper frame section lying opposite the water conveying duct 11, has four fastening points in the form of support rings 19. The support cable 20 of a lifting device, such as a crane, can be fastened on the support rings 19.

Figure 3:
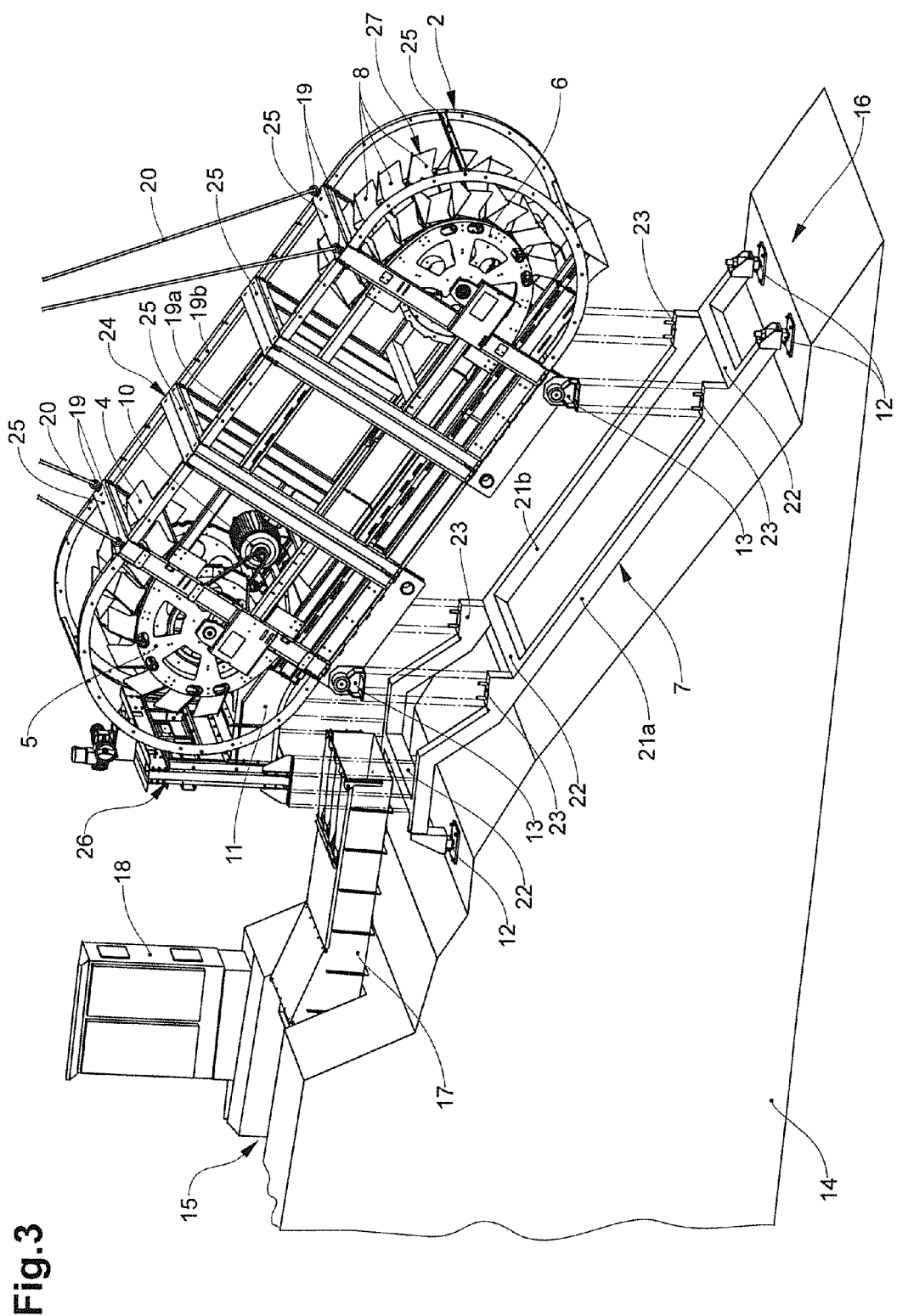
FIG. 3: shows a perspective view of a plant according to the invention during the installation of the energy extraction module.

In this way, the module frame 24, via the lifting device, can be accurately positioned over the installation site and by the modular feet 13 can be set down upon the connection interfaces 23 of the already installed sub-frame 7 (see FIG. 3).

The plant 1 also includes a control device 18 via which this is controlled.

Figure 4:
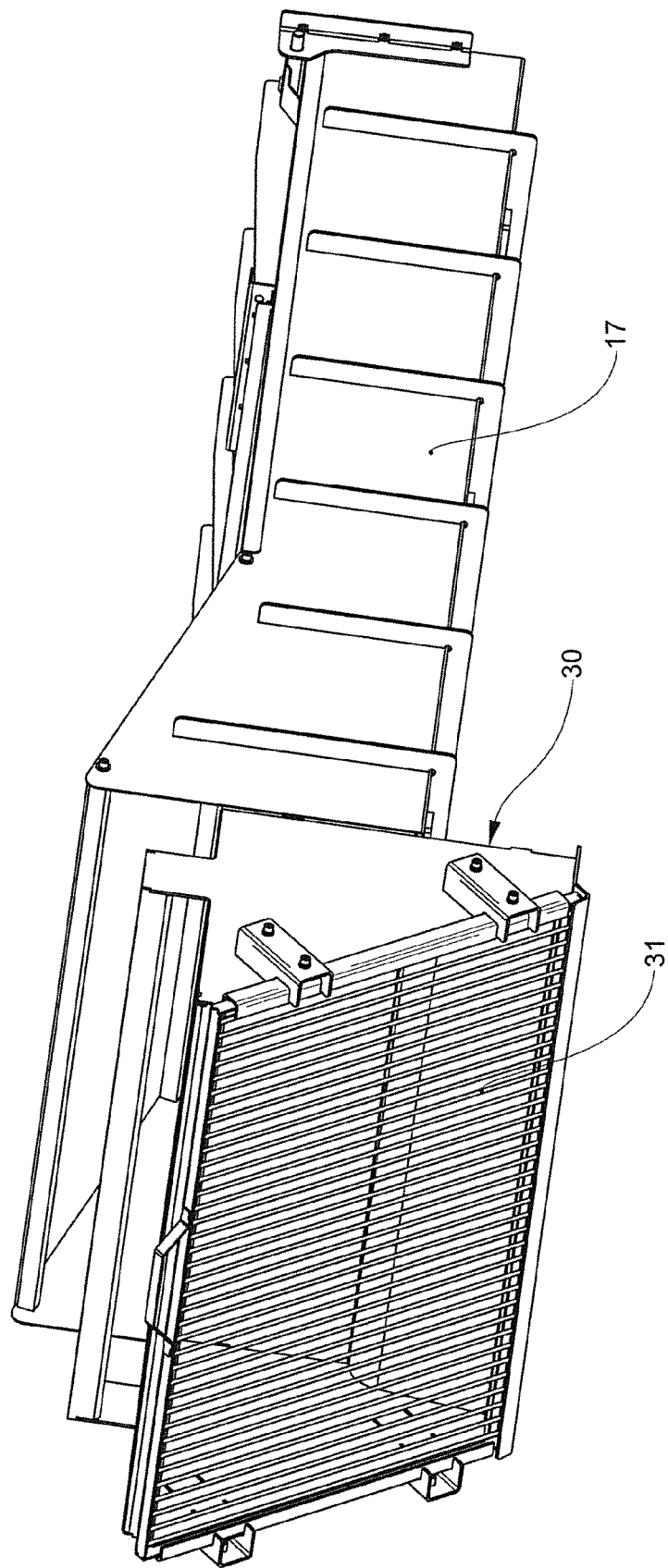
FIG. 4: shows a perspective view of the feed duct of a plant according to the invention.

FIG. 4 shows an enlarged perspective detail of the water feed duct 17 that connects the inlet region 15 to the water conveying duct 11 of the energy extraction module 2. The opening of the water feed duct 17, which points towards the inlet region 15, is provided with a passage limitation device 30. The passage limitation device 30 includes a grid 31, extending transversely across the duct opening, which serves for preventing coarse materials from entering into the water feed duct 17.

Figure 5:
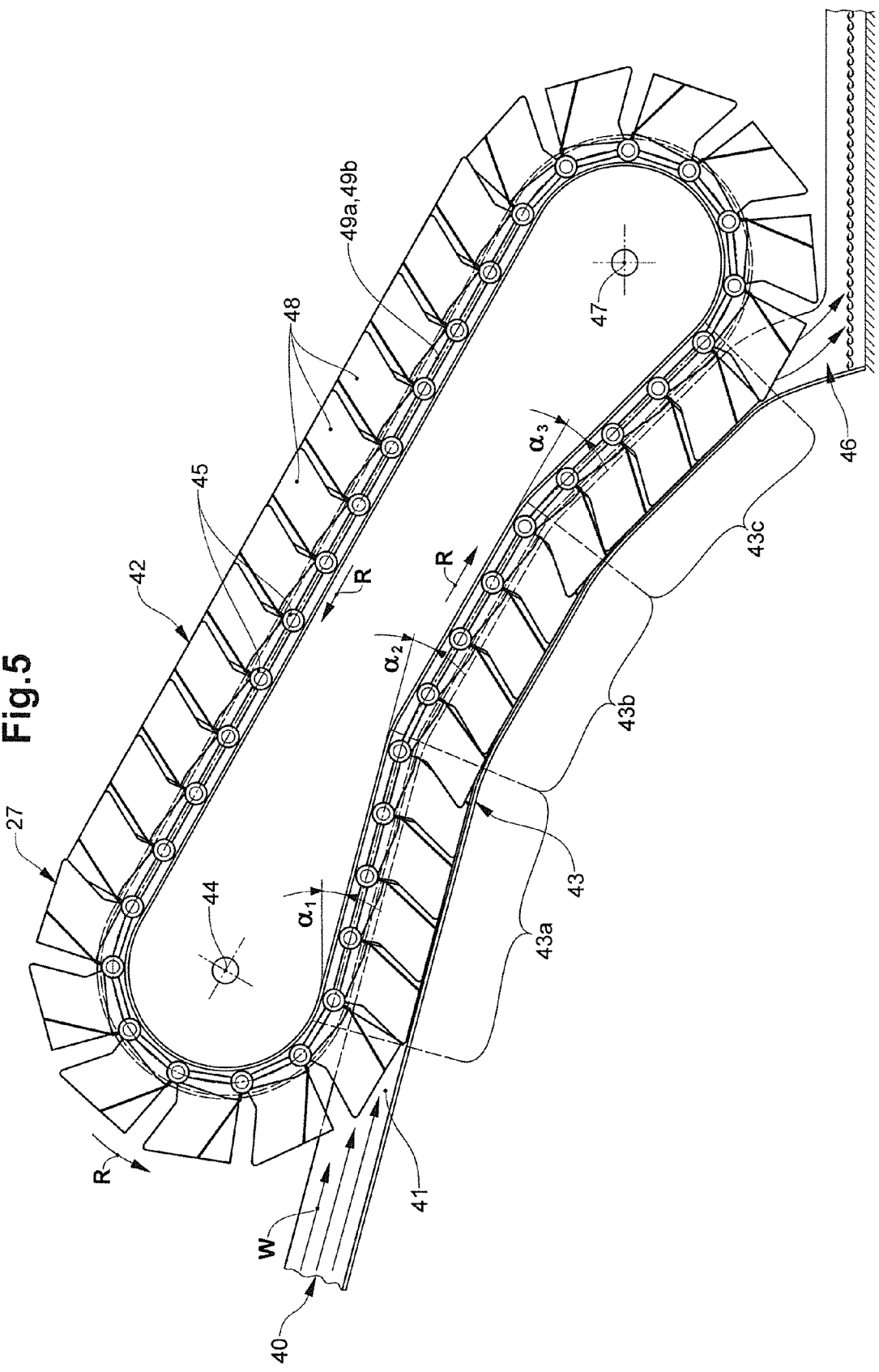
FIG. 5: shows a side view of a particular embodiment of a plant according to the invention.

FIG. 5 shows the flow-impinged components 48 of a drive arrangement that are positively guided along a circulating path around an upper deflection element 44 and a lower deflection element 47 and via guide rollers 45 in guide profiles 49a, 49b. The flow-impinged components 48 extend in the load section 43 that is arranged between an upper inlet region 40 and a lower outlet section 46 in a water conveying duct 41. The process water flows in a flow direction W to the inlet region 40. The flow-impinged components 48 together with the water conveying duct 41 form water receiving compartments.

The load section 43 includes three linear load sub-sections 43a, 43b, 43c which, as seen in the circulating direction R, have an inclination that increases in relation to a horizontal. A first load sub-section 43a, as seen in the circulating direction R, has a first inclination angle $\alpha_1$ in relation to a horizontal. A second load sub-section 43b, adjoining the first load sub-section 43a, has an inclination angle which is increased by the angle $\alpha_2$ in relation to the first load sub-section 43a. A third and last load sub-section 43c, adjoining the second load sub-section 43b, has an inclination angle that is increased by the angle $\alpha_3$ in relation to the second load sub-section 43b.

The drive arrangement additionally forms a return section 42 that is arranged opposite the load section 43 and above the load section. In the return section 42, the flow-impinged components are returned again from the outlet region 46 into the inlet region 40.

A linear generator can be arranged in each case in the load sub-sections 43a, 43b, 43c.

Figure 6:
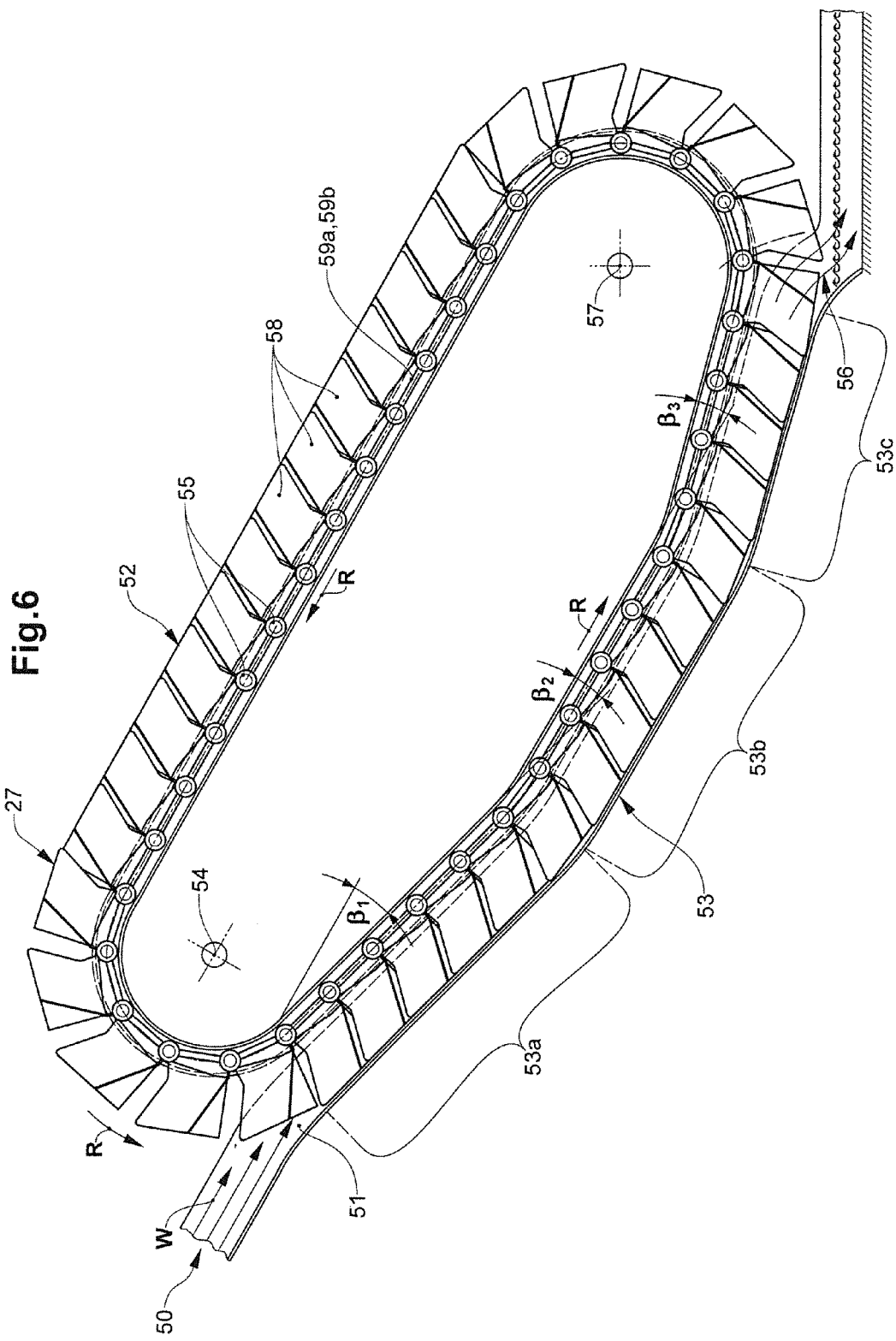
FIG. 6: shows a side view of a further particular embodiment of a plant according to the invention.

FIG. 6 shows the flow-impinged components 58 of a drive arrangement that are positively guided along a circulating path around an upper deflection element 54 and a lower deflection element 57 and via guide rollers 55 in guide profiles 59a, 59b. The flow-impinged components 58 extend in the load section 53 that is arranged between an upper inlet region 50 and a lower outlet region 56 in a water conveying duct 51. The process water flows in a flow direction W to the inlet region 50. The flow-impinged components 58 together with the water conveying duct 51 form water receiving compartments.

The load section 53 includes three linear load sub-sections 53a, 53b, 53c which, in contrast to the embodiment according to FIG. 5, have an inclination that reduces in relation to the horizontal, as seen in the circulating direction R. A first load sub-section 53a, as seen in the circulating direction R, has a first inclination angle $\beta_1$ in relation to a horizontal. A second load sub-section 53b, adjoining the first load sub-section 53a, has an inclination angle that is reduced by the angle $\beta_2$ in relation to the first load sub-section 53a. A third and last load sub-section 53c, adjoining the second load sub-section 53b, has an inclination angle that is reduced by the angle $\beta_2$ in relation to the second load sub-section 53b.

The drive arrangement additionally forms a return section 52 that is arranged opposite the load section 53 and above the load section. In the return section 52, the flow-impinged components are returned again from the outlet region 56 into the inlet region 50.

A linear generator can be arranged in each case in the load sub-sections 53a, 53b, 53c.

Figure 9:
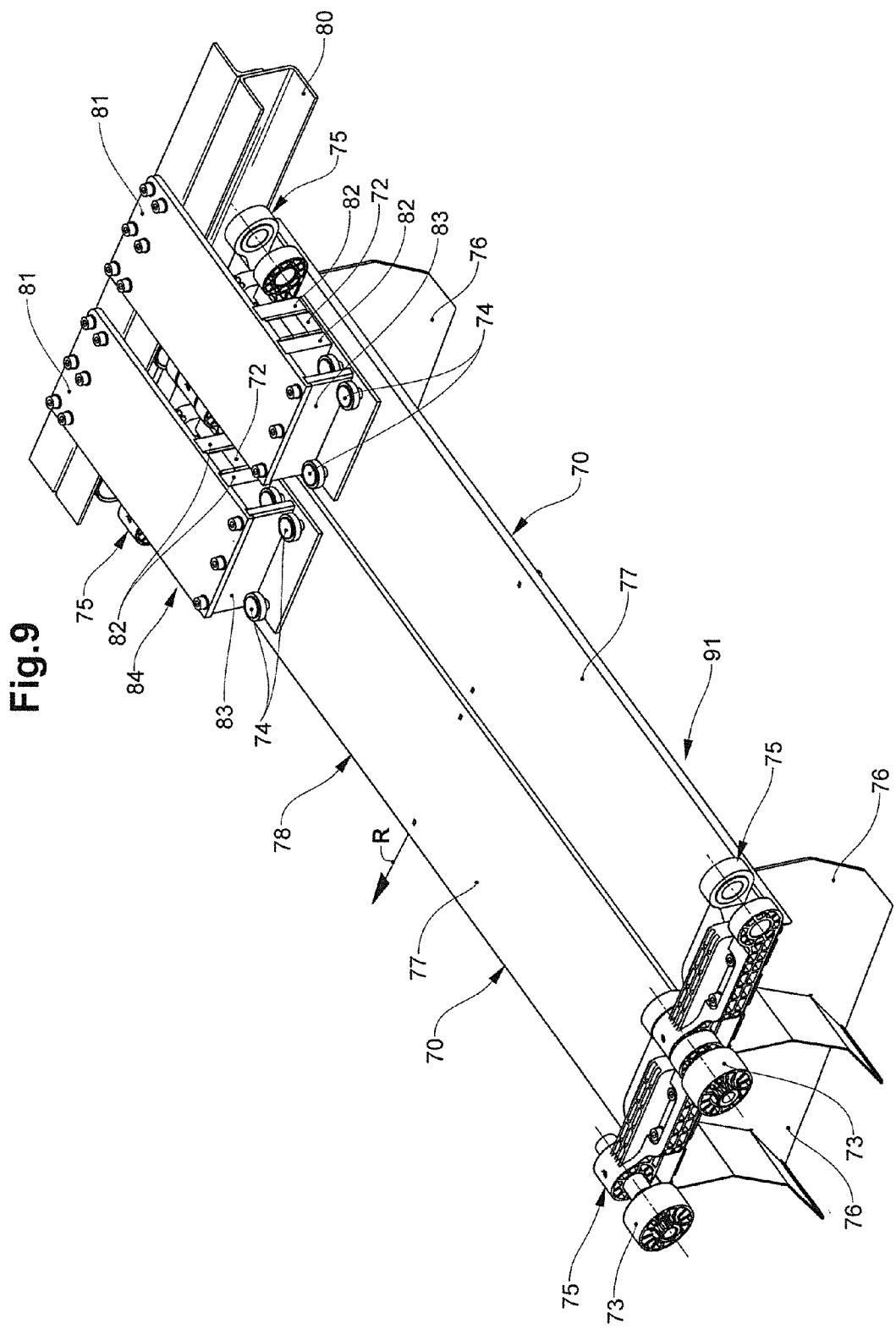
FIG. 9: shows a perspective view of the flow-impinged component, which is guided in a guide channel, according to FIG. 7.

FIGS. 7 to 9 show a particular embodiment of a flow-impinged component 70 that operates in conjunction with a linear motor and is moved in a circulating direction R. The flow-impinged component 70 includes a flat flow-impinged element 71 that extends transversely in a water conveying duct 90 and onto which flows the water, this being retained in a water receiving compartment 91 formed, inter alia, by the flow-impinged element 71.

The flow-impinged component 70 additionally includes stiffening walls 76 that extend transversely to the flow-impinged component 71, i.e. are orientated in the circulating direction R. The stiffening walls 76 serve to stiffen the flat flow-impinged component 71.

The flow-impinged component 70 additionally includes a support wall 77 that adjoins the flow-impinged component 71 and is orientated transversely to the flow-impinged component and also to the water conveying duct 90. The support wall 77 is arranged towards the duct opening.

A plurality of flow-impinged components 70 are inter-connected via connecting links 75 arranged at the sides, forming a chain-like drive arrangement 78. The connecting links 75 are arranged on the support wall 77.

The flow-impinged component 70 additionally comprise, in each case, guide rollers 73 that are arranged at the sides and connected to the connecting links 75 via a roller pivot. The guide rollers 73 are part of a guide device 84 and are guided, in each case, in a guide channel of a guide rail 80, which is also part of the guide device. The two guide rails 80 of the guide device 84 are arranged, in each case, at the sides of the water conveying duct 90 in the region of the duct opening. The guide device 84, including guide rails 80 and guide rollers 73, forms a positive guide.

The connecting link 75 includes a fork-like support section with two fork lugs that have, in each case, an opening for the passage of the roller pivot. In addition, the connecting link 75 includes a support body that lies opposite the fork-like support section in the circulating direction R. This also has an opening for the fitting of the roller pivot.

For producing the connection between two flow-impinged components 70, on both sides of the flow-impinged components 70 the support body of the connecting link 75 of a first flow-impinged component 70 is pushed between the fork lugs of the similarly formed connecting link 75 of an adjacent, second flow-impinged component 70. The roller pivot of the guide roller 73 is then pushed through the openings in the fork lugs and in the support body.

Furthermore, magnet arrangements 72 of a linear generator are attached on the support wall 77.

Moreover, pairs of alignment rollers 74 are also arranged on the support wall 77.

The field magnet arrangements 72, the alignment rollers 74 and also the connecting links 75 are arranged on the support wall 77 on the side lying opposite the water conveying duct 90.

Above the water conveying duct 90, i.e. above the duct opening, a mounting component 81 is attached in a stationary manner. The mounting component 81 lies opposite the support wall 77.

Stationary field coil arrangements 82, which are part of the linear generator and operate in conjunction with the field magnet arrangements 72 on the support wall 77, are attached on the mounting component 81. The field coil arrangements 82 are orientated towards the flow-impinged component 70 and correspondingly towards the field magnet arrangements 72. The field magnets 72 are arranged between the field coils 82 in the installed state of the flow-impinged components 70.

Furthermore, a roll element 83 is fastened on the mounting component 81 and projects from said mounting component 81 in the direction of the flow-impinged component 70 and correspondingly towards the alignment roller pair 74. The roll element 83 is guided between the two alignment rollers 74 of the alignment roller pair. If the flow-impinged components 70 are driven in the circulating direction R, then the alignment rollers 74 roll along the roll element 83 in a clearance-free manner. As a result, an exceptionally accurate lateral guiding with small tolerances is ensured. This guiding accuracy allows an arrangement of field coils 82 and field magnets 72 at a very small lateral distance from each other. The air gap between field coils 82 and field magnets 72 can be correspondingly minimized, which in turn increases the efficiency of the linear generator.

In the present exemplary embodiment, provision is made for three pairs of field coils 82 and field magnets 72 which in each case are arranged laterally, i.e. transversely to the water conveying duct (not shown), in a spaced-apart manner. Between two such pairs, provision is made in each case for a pair of alignment rollers 74 and roll element 83, that is to say two pairs in all.

The invention claimed is:

1. A plant for extracting electric energy from water power, said plant comprising an energy extraction module designed as an assembly unit, which comprises:
   a drive arrangement with a multiplicity of flow-impinged components that can be driven in a circulating direction by water power;
   at least two spaced-apart deflection elements that serve to guide the drive arrangement in a circulating manner;
   at least one electric power generator, which is driven by the circulating drive arrangement, for extracting electric energy;
   a water conveying duct; and
   a module frame, to which are connected the drive arrangement, the deflection elements, the at least one electric power generator and the water conveying duct;
   wherein the flow-impinged components are wall-like shaped and, in a region of a load section, are oriented transversely to the water conveying duct and engage in the water conveying duct and form, together with the water conveying duct, water receiving compartments, and wherein the module frame comprises an interface via which the energy extraction module is connected to a sub-structure.

2. The plant according to claim 1, wherein the interface comprises modular feet via which the energy extraction module is connected to the sub-structure.

3. The plant according to claim 1, wherein the plant comprises a support structure on which the energy extraction module is supported via the interface.

4. The plant according to claim 3, wherein the support structure is supported on a foundation via a support interface.

5. The plant according to claim 4, wherein the support interface includes support feet via which the support structure is supported on the foundation.

6. The plant according to claim 3, wherein the support structure is a ladder frame with longitudinal side rails and rungs that extend transversely to the rails.

7. The plant according to claim 3, wherein the support structure comprises connecting interfaces for receiving the connecting interfaces of the module frame.

8. The plant according to claim 1, wherein the module frame comprises fastening devices via which the energy extraction module can be connected to an installation device for installing upon the sub-structure.

9. The plant according to claim 1, wherein the plant comprises a guide device for positively guiding the flow-impinged components in the region of the load section.

10. The plant according to claim 9, wherein the guide device comprises guide elements that are arranged on the flow-impinged components, and the guide device comprises a guiding device along the load section in which the guide elements of the flow-impinged components are arranged in a movable manner such that the flow-impinged components are positively guided at least in the region of the load section.

11. An energy extraction module for a plant for extracting electric energy from water power
   wherein the energy extraction module is designed as an assembly unit, and comprises:
   a drive arrangement with a multiplicity of flow-impinged components that can be driven in a circulating direction by water power;
   at least two spaced-apart deflection elements, around which the drive arrangement is guided in a circulating manner;
   at least one electric power generator, which is driven by the circulating drive arrangement, for extracting electric energy;
   a water conveying duct; and
   a module frame, to which are connected the drive arrangement, the deflection elements, the at least one electric power generator and the water conveying duct;
   wherein the flow-impinged components are wall-like shaped and, in a region of a load section, are oriented transversely to the water conveying duct and engage in the water conveying duct and form, together with the water conveying duct, water receiving compartments, and wherein the module frame comprises an interface for connecting the energy extraction module to a sub-structure.

12. A plant for extracting electric energy from water power, comprising:
   a drive arrangement, which can be driven in a circulating direction by of water power, with a multiplicity of spaced-apart flow-impinged components that are arranged one behind the other in the circulating direction;
   at least two spaced-apart deflection elements that guide the drive arrangement in a circulating manner;
   at least one electric power generator, which is driven by the circulating drive arrangement, for extracting electric energy; and
   a water conveying duct,
wherein the drive arrangement forms a load section in a region of the water conveying duct,
   wherein the flow-impinged components are wall-like shaped and, in a region of a load section, are oriented transversely to the water conveying duct and engage in the water conveying duct and form, together with the water conveying duct, water receiving compartments, and
   wherein the electric power generator is a linear generator that forms an energy extraction path that lies at least partially in the load section.

13. The plant according to claim 12, wherein the at least one linear generator comprises stationary generator devices that are arranged in the region of the load section, and the generator devices comprise non-movable parts of the linear generator.

14. The plant according to claim 13, wherein the generator devices comprise at least one field coil.

15. The plant according to claim 12, wherein the at least one linear generator comprises at least one movable field magnet.

16. The plant according to claim 15, wherein the flow-impinged components interact at least in sections with co-moving field magnets.

17. The plant according to claim 15, wherein the field magnets are permanent magnets.

18. The plant according to claim 15, wherein the field magnets are fastened on the flow-impinged components.

19. The plant according to claim 15, further comprising a guide device for positively guiding the at least one movable field magnet relative to at least one field coil in the region of the load section.

20. The plant according to claim 12, wherein the generator devices are arranged between the load section and a return section and also between an upper deflection element and a lower deflection element.

21. The plant according to claim 12, wherein the generator devices are arranged symmetrically to both sides of the load section.

22. The plant according to claim 12, wherein the flow-impinged component comprises a flow-impinged element and a support wall, the support wall, in a region at a distance from the duct bottom, adjoins the flow-impinged element and is orientated transversely to the flow-impinged element and also to the water conveying duct, on which support wall generator devices are arranged.

23. The plant according to claim 12, wherein the drive arrangement forms a return section which is arranged opposite the load section, wherein the return section is arranged above or below the load section.

* * * * *